United States Patent [19]

Geiger

[11] Patent Number: 4,629,883
[45] Date of Patent: Dec. 16, 1986

[54] PROTECTIVE DEVICE FOR MOVABLE SHELVES

[75] Inventor: Edgar Geiger, Kötz, Fed. Rep. of Germany

[73] Assignee: Karl Mengele & Söhne, Günzburg/Donau, Fed. Rep. of Germany

[21] Appl. No.: 595,282

[22] Filed: Mar. 30, 1984

[30] Foreign Application Priority Data

Apr. 2, 1983 [DE] Fed. Rep. of Germany ........ 3312191

[51] Int. Cl.$^4$ .................................................. G01V 9/04
[52] U.S. Cl. ........................................ 250/221; 340/556
[58] Field of Search ............................. 250/221, 222.1; 340/555, 556, 557

[56] References Cited

U.S. PATENT DOCUMENTS

| | | | |
|---|---|---|---|
| 3,242,341 | 6/1965 | Woodward | 250/221 |
| 3,360,654 | 12/1967 | Müller | 250/221 |
| 3,612,884 | 10/1971 | Linardos et al. | 250/222.1 |
| 3,842,260 | 10/1974 | Christensen et al. | 250/221 |
| 4,266,124 | 5/1981 | Weber et al. | 250/221 |
| 4,309,696 | 1/1982 | Nagai et al. | 250/221 |

Primary Examiner—David C. Nelms
Assistant Examiner—Michael Messinger
Attorney, Agent, or Firm—Toren, McGeady, Stanger, Goldberg & Kiel

[57] ABSTRACT

A protective device for movable mechanical shelves, such as paternoster shelves, discontinues movement of the shelves when obstructions are located in their path. The protective device includes light barriers positioned at the boundaries of an opening at which the shelves can be selectively positioned. Electric circuitry connects the light barriers and the motor for driving or moving the shelves. The electric circuitry permits the testing of the operational readiness of the overall protective device during the movement of the shelves.

1 Claim, 3 Drawing Figures

PROTECTIVE DEVICE FOR MOVABLE SHELVES

SUMMARY OF THE INVENTION

The present invention is directed to a protective device for mechanical shelves, particularly paternoster shelves, where the shelves are guided, in turn, to a removal opening by a motor operated drive actuatable by a selector device so that the drive device is automatically turned off when the moving shelves encounter an obstruction.

Known protective devices of this type include contact strips or shoulders arranged in a continuous manner parallel to the upper and lower boundaries of the removal opening. Such contact strips project somewhat into the removal opening under the biasing action of springs and are pressed upwardly or downwardly, for instance, by the hand of a user, so that an interrupter switch for the motor operated drive is actuated.

Guides for these contact strips, which are very long, are very costly, since the strips may not be allowed to twist or tilt. In spite of the cost, the possibility of damage is not entirely eliminated, since a certain regulating distance and switching distance is necessary so that the protective device does not respond to shocks or vibrations. Moreover, foreign objects may enter the guides and block the protective device and the presence of such objects cannot be easily checked.

Therefore, the primary object of the present invention is to provide a protective device of the above-listed type which responds immediately, cannot be blocked and, moreover, is constantly checked for its operational readiness.

In accordance with the present invention, at least one one-way light barrier formed of a transmitter and a separate receiver, forms part of the protective device so that the barrier is aligned parallel to one of the upper or lower boundary of the removal opening for the shelves. The switching circuit of the switch for the drive motor is closed by an electro-mechanical relay self-locking connection until the predetermined shelf reaches the removal opening or when the light barrier is actuated or the operation is terminated, and the self-locking relay kicks out. The relay self-locking connection is provided with a second equivalent output of the receiver and a relay is arranged in each instance with force-guided contacts at the output and the transmitter switches dark by means of a relay connection, which is temporarily actuated by the switch of the selecting device for testing the operational readiness of the overall protective device arrangement after which the switch circuit is closed by interrupting the relay self-locking connection.

Light barriers of this type are known per se. What is surprising, however, is that the operational readiness of the light barriers is checked automatically during the movement of a shelf to the removal opening. Since the operational readiness of the light barriers can be checked continuously during operation, they can be used as part of the protective device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
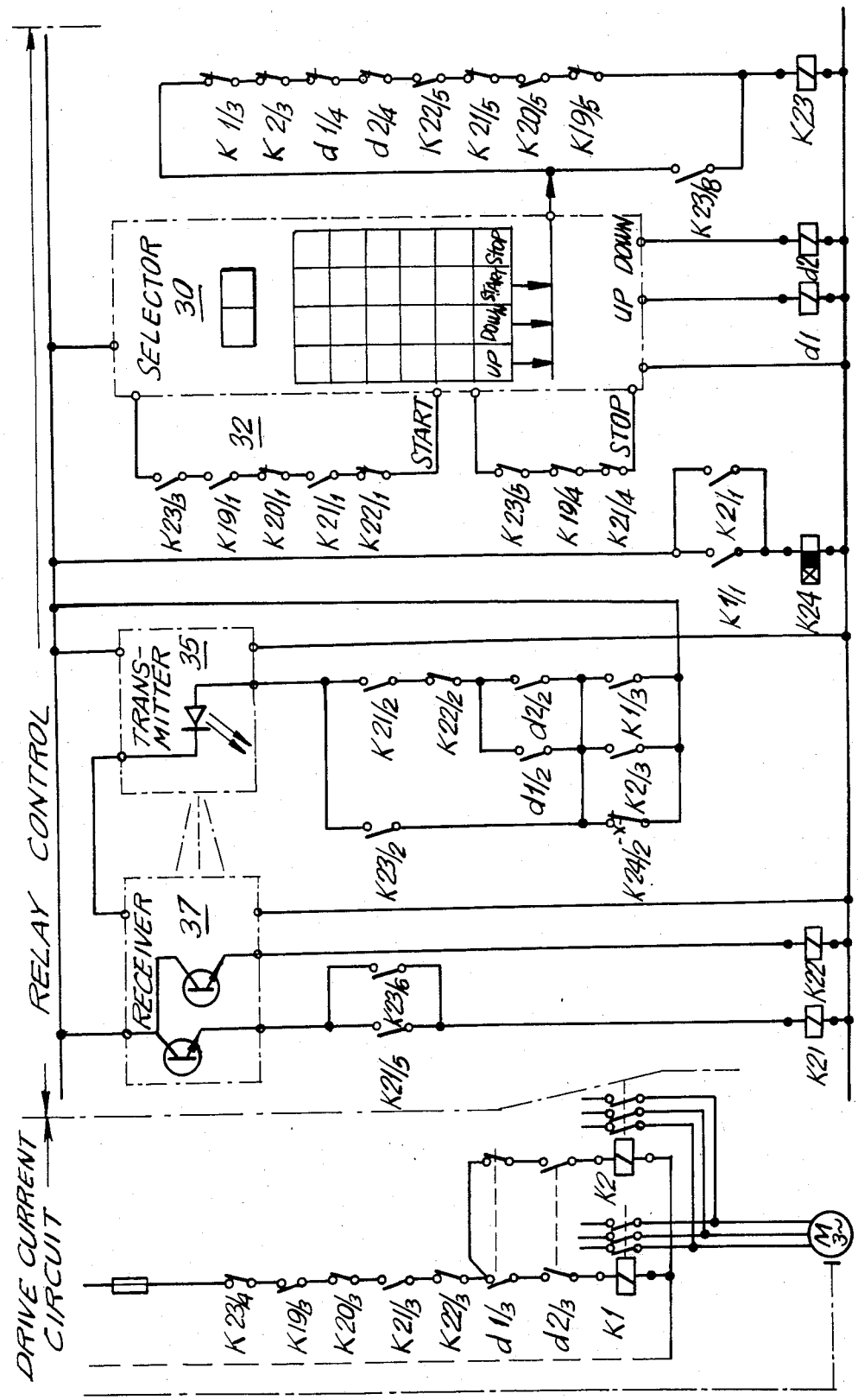
FIG. 1 is a circuit diagram illustrating the operation of a protective device for mechanical shelves in accordance with the present invention.
Figure 2:
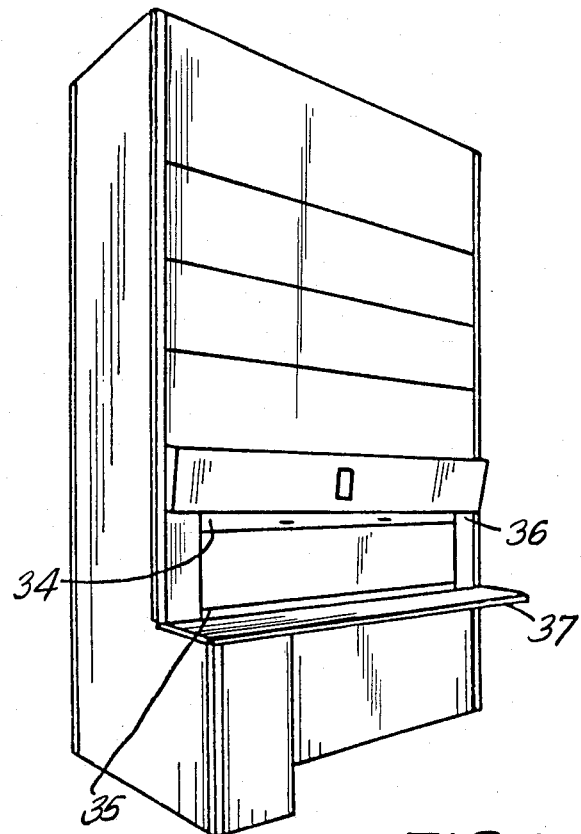
FIG. 2 is a perspective view of a mechanical shelf arrangement embodying the light barrier arrangement of the present invention.
Figure 3:
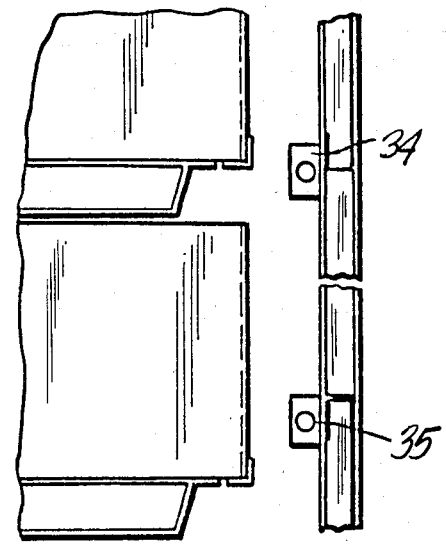
FIG. 3 is a partial sectional view through the mechanical shelf arrangement shown in FIG. 2.

In the circuit diagram, note FIG. 1, a numerical shelf selecting device 30 is illustrated having a key or switch 32 serving, among other things, for starting the operation of the mechanical shelf arrangement shown in FIG. 2. The mechanical shelves are shown within a cabinet with an opening to which a shelf can be moved. The opening has an upper side and a lower side. A light barrier is provided along each of the upper side and lower side of the removal opening from the cabinet. The light barrier consists of a transmitter 34, 35 and a corresponding receiver 36, 37. A switch 32 for the light barrier is located in the circuitry of the selecting device 30. A drive motor, not shown, is provided with contacts and switching elements. Mechanical shelves not shown are located in the cabinet displayed in FIGS. 2 and 3. The removal opening from the cabinet containing the shelves is protected or safeguarded by the light barriers.

The arrangement is shown in the drawing functions in the following manner:

Start start relay K 23 is excited via K 1/3, K 2/3, d 1/4, d 2/4, K 19/5, K 20/5, K 21/5 and K 22/5 and passes into the self-locking condition;

K 23/2 switches transmitter 35 to the bright condition, the output signals of the receiver 37 changes its stage, K 21 effects a pulling action, K 22 drops out;

K 23/3, K 19/1, K 20/1, K 21/1 and

K 22/1 supply a start signal to the electronic system; in accordance with the preselected direction of the shelves relay d 1 or d 2 pulls up; accordingly, transmitter inputs pass into self-locking via K 21/2, K 22/1, d 1/2, or d 2/2 and K 24/2.

The start pulse drops out relay K 23 drops out, direction contact 38 or 39 is excited via K 23/4, K 19/3 K 20/3, K 21/3, K 22/3 and d 1/3 or d 2/3 and the motor is driven in the preselected direction.

The shelves, not illustrated, begin to move; K 1/1 or K 2/1 (according to the direction of movement) effects a temporarily delayed pulling up of K 24;

During the engagement of the transmitter 35 in the light barrier, the outputs K 21/K 22 are caused during engagement to change their state; if the direction contact K 1 or K 2 is de-energized via K 19/3, K 20/3 or K 21/3, K 22/3, the self-locking circuit is interrupted, the control passes into the output position, and the electronic system obtains a stop signal via K 23/5, K 19/4 and K 21/4.

If, on the other hand, the preselected position of a shelf is reached, d 1 or d 2 drops out, the direction contact K 1 or K 2 is de-energized via d 1/3 or d 2/3, the relay K 24 drops out, after a delay, via K 1/1 or K 2/1; K 2/2 or K 1/2 and K 2/3 or K 1/3 release the self-lock of the control circuit when K 24/1 or K 24/2 is open, and the control passes into the output position.

Accordingly, before each individual movement of the shelves, the start switch or key 32 initially triggers a test process via the "start" signal. The light barrier outputs must be in the dark connection and the relays, contacts and electronic system must be located in the output position before the equivalent outputs of the light barriers set a direction signal in cooperation with the preselecting electronic system after switching the light barrier to the bright connection. The dropping out of the start signal introduces the movement of the shelves via the direction signal.

If the light beam from the transmitter 35 is interrupted during the movement of the shelves, then the movement is interrupted by the change of the equivalent outputs of the corresponding receiver 37 and the transmitter is switched to dark. If the preselected shelf is positioned without engagement in the light beam, then a dark connection of the transmitter for testing is likewise effected. Accordingly, it is ensured, before each release for movement of the shelves, that a test phase or process is performed. A movement of the device is prevented when the light barrier 35,37 drops out or during some other malfunction of the device.

While specific embodiments of the invention have been shown and described in detail to illustrate the application of the inventive principles, it will be understood that the invention may be embodied otherwise without departing from such principles.

I claim:

1. Protective device for use with movable mechanical shelves or similar devices, such as paternoster shelves, where the shelves are arranged to be guided along a path of movement to a removal opening, including at least one light barrier and a circuit for checking the removal opening, said at least one light barrier comprising a light transmitter and a separate light receiver aligned parallel to one of the upper and lower edges of the removal opening, wherein the improvement comprises an electrical current circuit for said protective device, an electromechanical relay control and several switches arranged so that the electrical current circuit is closed by the electromechanical relay control and said several switches until the required shelf is positioned in the removable opening or the light barrier is interrupted, such as by an intervening hand placed in the removal opening and the light transmitter (35) is switched off from the current, a relay having two outputs and respective relays (K 21, K 22) for switching off the current to said light transmitter and said light receiver (37), one of said respective relays operates as a contact closing the device and the other said respective relay operates as a contact opening device, two switches (K 21/3, K 22/3) doubly interrupt the electrical current circuit and tube switches (K 21/5, K 22/5) for closing a test current circuit, a selector (30) having a selector key whereby after pressing the selector key the light transmitter (35) switches to the bright condition via a starting relay (K 23) and an associated switch (k 23/2) and the bright condition afforded permits a start signal to return to the selector (30) only when an intact light barrier and relay control through said receiver is effective by changing the circuit conditions of said relays (K 21, K22) and switches (K 21/1, K 22/1) associated with said relays (K 21, K22) and shelf directional relays (d 1, d 2) connected to said electrical current circuit for releasing a directional order of movement of the shelves to the electrical current circuit.

* * * * *